US012715814B2

(12) United States Patent
Chaouche et al.

(10) Patent No.: US 12,715,814 B2
(45) Date of Patent: Aug. 25, 2026

(54) METHOD FOR ACCELERATING AND FLUIDIFYING WET CONCRETES OR MORTARS COMPOSITIONS COMPRISING AN ACTIVATING AGENT, A WATER REDUCING POLYMER, CONSISTING IN USING PERFORMANCE ADDITIVE INCLUDING CHAOTROPIC IONS AND ITS USE IN LOW CARBON ALTERNATIVE BINDER COMPOSITIONS

(71) Applicants: ECOCEM MATERIALS LIMITED, Dublin (IE); ECOLE NORMALE SUPERIEURE PARIS-SACLAY, Gif sur Yvette (FR); CENTRE NATIONAL DE LA RECHERCHE SCIENTIFIQUE—CNRS-, Paris (FR)

(72) Inventors: Mohend Chaouche, Gif sur Yvette (FR); Laurent Frouin, Paris (FR); Roberta Alfani, Paris (FR); Matthew Cruickshank, Gif sur Yvette (FR)

(73) Assignees: ECOCEM MATERIALS LIMITED, Dublin (IE); ECOLE NORMALE SUPERIEURE PARIS-SACLAY, Gif sur Yvette (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 811 days.

(21) Appl. No.: 17/917,049

(22) PCT Filed: Apr. 8, 2021

(86) PCT No.: PCT/EP2021/059215

§ 371 (c)(1),
(2) Date: Oct. 5, 2022

(87) PCT Pub. No.: WO2021/204962

PCT Pub. Date: Oct. 14, 2021

(65) Prior Publication Data

US 2023/0192552 A1 Jun. 22, 2023

(51) Int. Cl.
*C04B 28/14* (2006.01)
*C04B 14/10* (2006.01)
(Continued)

(52) U.S. Cl.
CPC ............ *C04B 28/14* (2013.01); *C04B 14/106* (2013.01); *C04B 14/28* (2013.01); *C04B 28/08* (2013.01);
(Continued)

(58) Field of Classification Search
CPC .... Y02W 30/91; Y02P 40/10; C08L 2666/04; C08L 2205/05; E01C 7/147
See application file for complete search history.

(56) References Cited

U.S. PATENT DOCUMENTS

2016/0016852 A1 1/2016 Guzzetta et al.
2017/0057869 A1 3/2017 Guzzetta et al.

FOREIGN PATENT DOCUMENTS

WO 2019/077389 4/2019
WO WO-2019077389 A1 * 4/2019 ............ C04B 18/14

OTHER PUBLICATIONS

"A Comprehensive Guide for Materialmen", Sep. 30, 2007, Editorial Committee. ed., China Building Materials Press, p. 155.
(Continued)

*Primary Examiner* — Amber R Orlando
*Assistant Examiner* — Ryan Patrick Loughran
(74) *Attorney, Agent, or Firm* — Millen, White, Zelano & Branigan, P.C.; Christopher W. Brody

(57) ABSTRACT

The invention concerns a method for fluidifying wet concrete or industrial mortar compositions comprising:
(a) at least one hydraulic binder,
(Continued)

(b) at least one water reducing polymer,
(c) at least one accelerator in the form of a salt containing at least one kosmotropic ion,
(d) water, and
(e) possibly one or more supplementary cementitious materials, and
(f) possibly one or more filler materials, the method comprising a step of adding at least one salt (ch) including at least one chaotropic ion to the concrete or industrial mortar composition.

10 Claims, 5 Drawing Sheets

(51) Int. Cl.
*C04B 14/28* (2006.01)
*C04B 28/08* (2006.01)
*C04B 103/10* (2006.01)
*C04B 103/30* (2006.01)

(52) U.S. Cl.
CPC .... *C04B 2103/10* (2013.01); *C04B 2103/302* (2013.01)

(56) References Cited

OTHER PUBLICATIONS

T. Nawa et al., "Effect of alkali sulfate on the . . . paste containing a superplasticizer", Proceedings of the 3$^{rd}$ Canmetiaci International Conference on Supetplas-Ticizers and Other Chemical Admixtures in Concrete, Dec. 31, 1989.
Hebert et al., "Chaotropic substances . . . cement-based materials", Materials Research, vol. 11, No. 2, Jun. 1, 2008.
Ashit et al., "Modulating Nucleation by . . . Testing the Waters", Crystals, vol. 7, No. 10, Oct. 6, 2017.
European Patent Office Office Action dated Jun. 11, 2025 issued in corresponding application EP21716229.6.

* cited by examiner

METHOD FOR ACCELERATING AND FLUIDIFYING WET CONCRETES OR MORTARS COMPOSITIONS COMPRISING AN ACTIVATING AGENT, A WATER REDUCING POLYMER, CONSISTING IN USING PERFORMANCE ADDITIVE INCLUDING CHAOTROPIC IONS AND ITS USE IN LOW CARBON ALTERNATIVE BINDER COMPOSITIONS

FIELD OF THE INVENTION

The technical field of the invention relates to mineral binder compositions which provide an accelerating and fluidifying effect.

More particularly, the invention relates to a method for accelerating and fluidifying wet concretes or mortars compositions including at least one activating agent comprising a kosmotropic ion and at least one water-reducing polymer, by adding at least one salt comprising a chaotropic ion which co-fluidifies with the water reducing polymer said wet concretes or mortars compositions.

The invention also relates to the use, throughout the concrete industry composed of some combination of hydraulic binders, supplementary cementitious materials, and filler materials and including at least one activating agent comprising a kosmotropic ion and at least one water-reducing polymer, of at least one salt comprising a chaotropic ion to provide favorable fresh state rheology and early-age hardened state mechanical properties.

BACKGROUND ART

Supplementary cementitious materials (SCMs), for instance mortars and concretes containing significant amounts of Ground Granulated Blast furnace Slag (GGBS), are being increasingly used since ordinary Portland cement production has a strong and negative impact on the environment due to the emissions of large quantities of carbon dioxide. The production of cement inherently generates $CO_2$ during the calcination of the raw materials at very high temperature (1450° C.) in a kiln through decarbonation of the limestone (Eq. (1)):

$$CaCO_3(s) \rightarrow CaO(s) + CO_2(g) \quad \text{(Eq. (1))}$$

In addition, carbon dioxide is released as a result of the combustion of the fossil fuels needed to heat the cement kiln. By adding the additional emissions of grinding, almost one ton of $CO_2$ per ton of Portland cement is obtained. Overall, the cement industry is responsible for about 7 to 9% of the global carbon dioxide emissions.

Moreover, it is generally necessary to add an accelerator in said binders containing significant amounts of SCMs in order to produce mortar or concrete having the desired early-age mechanical properties. Activating agents are often used in order to accelerate the strength development of these alternative binders. Activating agents are compounds which induce alkaline conditions favorable to the strength development of SCM-containing binders. Activating agents are compounds which most commonly have sodium or potassium as their cation and hydroxide, silicate, sulfate, or carbonate as their anion. However, these salts may have a negative impact on the Portland cement. WO 2019/077389 discloses a method for avoiding this negative impact, in which a retardant is incorporated into the cement composition and the accelerator is added at least 30 second after the mixing of the other ingredients.

So as to improve fluidity and workability of mortars and concretes, it is common to add a water reducing polymer, also known as a plasticizer or superplasticizer.

Although these water reducing polymers are efficient for mortars and concretes having a binder essentially made of ordinary Portland cement, they are often less effective in improving fluidity and workability of mortars and concretes having a binder containing SCMs. In addition, the above mentioned accelerators generally render the water reducing polymer less soluble and decrease its efficiency.

As a result, a given water reducing polymer is more or less efficient depending on the binder or concrete composition.

As a consequence, in alternative binder compositions made with SCMs and activating agents, the water reducing polymer cannot fully play its role and the concrete or mortar is not as fluid and workable as expected.

So as to overcome this issue, efforts have been made to develop water reducing polymers designed for alternative binder compositions made with SCMs and alkaline activating agents.

This solution cannot be applied to every binder activated with an activator.

Hence, it would be beneficial to have a solution different from the above mentioned one, which could be suitable for all kinds of alternative binder compositions made with SCMs and activating agents with only a few parameters to adapt.

In this context, the invention aims at addressing at least one of the above problems and/or needs, through fulfilling at least one of the following objectives:

- -O1- Providing a method for fluidifying binder compositions including some combination of hydraulic binders and possibly, supplementary cementitious materials, and/or filler materials and for fluidifying wet mortars and concretes.
- -O2- Providing mortars and concretes with appropriate rheology in the wet state, before setting, and with good mechanical properties after setting, especially good early age strength.
- -O3- Providing an efficient process for fluidifying wet concrete or industrial mortar compositions before setting and for accelerating strength development after said setting, wherein said compositions include at least one water reducing polymer and at least one alkaline accelerator in the form of a salt containing at least one kosmotropic ion.
- -O4- Providing ready mix and precast concrete comprising alternative binder compositions made with SCMs and activated with an activating agents, fluidified with at least one common water reducing polymer.

SUMMARY OF THE INVENTION

The invention concerns a method for fluidifying wet concrete or industrial mortar compositions comprising:

(a) at least one hydraulic binder, (b) at least one water reducing polymer, (c) at least one accelerator in the form of a salt containing at least one kosmotropic ion, (d) water, and (e) possibly one or more supplementary cementitious materials, and (f) possibly one or more filler materials, the method comprising a step of adding at least one salt (ch) including at least one chaotropic ion to the concrete or industrial mortar composition.

The invention also concerns the use, as a co-fluidifier with at least one water reducing polymer (b), of at least one salt (ch) including at least one chaotropic ion, of a wet concrete or industrial mortar composition comprising water, at least a binder fraction and at least one aggregate fraction, the binder fraction comprising:

(a) at least one hydraulic binder, (c) at least one accelerator in the form of a salt containing at least one kosmotropic ion, (d) water, and (e) possibly one or more supplementary cementitious material, and (f) possibly one or more filler material.

The invention is further directed to a method for fluidifying a wet concrete or industrial mortar compositions comprising:

(a) at least one hydraulic binder, (c) at least one accelerator in the form of a salt containing at least one kosmotropic ion, (d) water, and (e) possibly one or more supplementary cementitious materials, and (f) possibly one or more filler materials, the method comprising a step of addition, to the concrete or industrial mortar composition, of at least one salt (ch) including at least one chaotropic ion and at least one water reducing polymer (b) in a quantity, for obtaining said wet concrete or industrial mortar composition in a targeted consistency class, according to European standard EN 206, not increased compared to a wet concrete or industrial mortar composition (CEC) comprising component a, c, d, possibly e, and possibly f, but not comprising component c of the same targeted consistency class.

The invention further concerns a performance additive, having a free water content of less than 0.5% in weight, for accelerating and fluidifying wet concrete or industrial mortar compositions comprising at least one hydraulic binder (a), at least one water reducing polymer (b) at least one accelerator (c) in the form of a salt containing at least one kosmotropic ion;

said additive including at least one salt (ch) including at least one chaotropic ion.

Although activating agents are typically incompatible with water reducing polymers, significantly reducing their ability to fluidify a cementitious system, the inventors have surprisingly discovered that the addition of a salt comprising a chaotropic ion, in particular a chaotropic anion allows enhancing the action of water reducing polymers.

One of the merits of the inventors is to have brought to light the deleterious effect of kosmotropic ions in accelerators, as well as the annihilation, or at least the moderation of said deleterious effect, through the implementation of chaotropic ion(s), in building material systems including hydraulic binder(s), notably GGBS, water reducing polymer(s) and accelerator(s) in the form of at least one salt containing at least one alkali cation and at least one kosmotropic ion.

One of the advantages of this invention is to provide a method which provides a strong fluidifying effect.

Another advantage is an extension of the open time. Not only the desired fluidifying effect initially present, but the method permits the fluidity to remain longer than is typically possible in the presence of an activating agent and water reducing polymer.

General Definitions

According to the terminology of this text, the following non limitative definitions have to be taken into consideration:

"binder" refers to a material composed of one or more hydraulic binders and possibly one or more supplementary cementitious material and possibly one or more filler material.

"hydraulic binder" refers to a material that hardens through its reaction with water. Here the term refers to pure ordinary Portland cement and normalized cements made with, calcium aluminate cement, calcium sulfoaluminate cement, belite cement, ground granulated blast furnace slag, basic oxygen furnace slag, ladle slag, super sulfated cement, hydraulic lime, cement kiln dust, or a mixture thereof.

"supplementary cementitious material" refers to a material which contributes to the strength of a binder through latent hydraulic or pozzolanic activity. Here the term refers to ground granulated blast furnace slag, fly ash, activated clay, silica fume, basic oxygen furnace slag, natural pozzolanic materials, rice husk ash, activated recycled concrete fine aggregates or a mixture thereof.

"filler material" refers to a material whose primary role in a binder is physical rather than chemical. Fillers occupy pore spaces and are used as substitutes for hydraulic binders and supplementary cementitious materials as they are less energy intensive. Here the term refers to ground limestone, ground dolomite, marble powder, siliceous sands, recycled concrete fine aggregates or a mixture thereof.

"slag" denotes a stony waste matter separated from metals during the smelting or refining of ore.

"GGBS" or "GGBFS": Ground Granulated Blast Furnace Slag, which is equivalent to blast furnace slag, Granulated Blast Furnace Slag (GBFS), blast furnace water-crushed slag powder and blast furnace slag fine aggregate.

"cement" is understood as meaning a powdery substance made for use in making mortar or concrete. It is a mineral binder, possibly free from any organic compound. It includes ordinary Portland cement, Portland-slag cements, Portland-silica fume cements, Portland-pozzolana cements, Portland-fly ash cements, Portland-burnt shale cements, Portland-limestone cements, Portland-composite cements, Blast furnace slag cements, super sulfated cements, calcium aluminate cements, Pozzolanic cements, and composite cements.

"mortar" refers to a material composed of binder(s) and aggregates such as sand.

"concrete" refers to a material composed of binder(s) and aggregates such as sand and (fine) gravel.

"Dry weight" is the weight of material in its natural state (without adding of water or another solutions from outside).

"Apparent viscosity" is the shear stress applied to a fluid divided by the shear rate, it is used to express the viscosity of non-Newtonian fluids where the viscosity depends on the shear rate, in International System (IS) units, apparent viscosity is expressed in Pascal seconds (Pa·s).

DETAILED DESCRIPTION OF THE INVENTION

Figure 1:
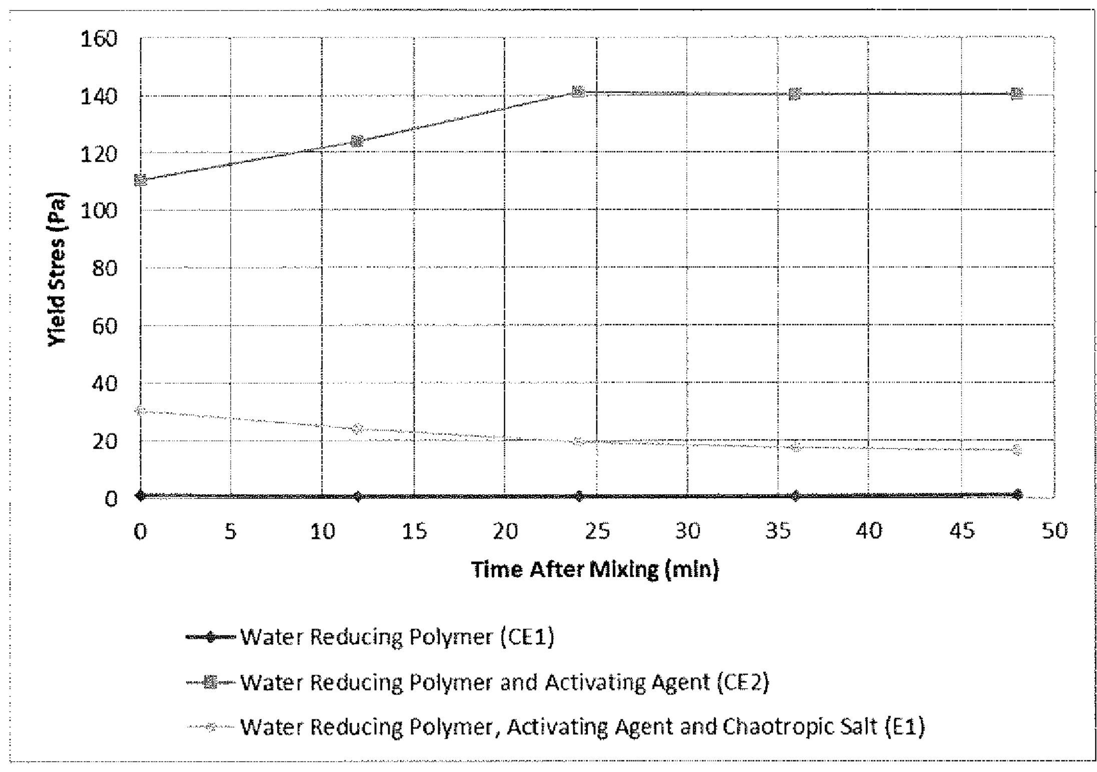
FIGS. 1 to 7 are graphs of yield stress versus time after mixing of wet binder composition samples. These graphs present the impact of water reducing polymers (b), kosmotropic activating agents (c), and the salt (ch) including at least one chaotropic ion on the yield stress of paste samples.

The Method for Fluidifying Wet Concrete or Industrial Mortar Composition

The method for fluidifying wet concrete or industrial mortar composition comprises:

- (a) one hydraulic binder,
- (b) at least one water reducing polymer,
- (c) at least one accelerator in the form of a salt containing at least one kosmotropic ion,
- (d) water, and
- (e) possibly one or more supplementary cementitious materials, and
- (f) possibly one or more filler materials, the method comprising a step of addition of at least one salt (ch) including at least one chaotropic ion to the concrete or industrial mortar composition.

As used herein, a "kosmotropic ion" is an ion that enhances water structure and decreases the solubility of nonpolar solvent molecules or particles.

More specifically, in the meaning of the invention, an ion is considered as being kosmotropic if it decreases aqueous solubility of a given water reducing polymer. Indeed, the influence of an ion depends on the water reducing polymer used.

As used herein, a "chaotropic ion" is an ion that disrupts water structure, and increases the solubility of nonpolar solvent molecules or particles.

More specifically, in the meaning of the invention, an ion is considered as being chaotropic if it allows solubilizing a given water reducing polymer. Indeed, the influence of an ion depends on the water reducing polymer used.

The Use as a Co-Fluidifier of at Least One Salt (Ch) Including at Least One Chaotropic Ion As mentioned above, one objective of the invention is to provide concretes and industrial mortars with appropriate rheology in the wet state, before setting, and with good mechanical properties after setting, especially good early age strength. So as to achieve this objective, the invention also concerns the use, as a co-fluidifier with at least one water reducing polymer (b), of at least one salt (ch) including at least one chaotropic ion for wet concrete or industrial mortar compositions comprising water, at least a binder fraction and at least one aggregate fraction, the binder fraction comprising:

- (a) at least one hydraulic binder,
- (c) at least one accelerator in the form of a salt containing at least one kosmotropic ion,
- (e) possibly one or more supplementary cementitious material, and
- (f) possibly one or more filler material.

The amount of the salt (ch) including at least one chaotropic ion, as a co-fluidifier, in the binder fraction depends on the nature and quantities of the other components of the binder fraction. Therefore, the content of each component of the binder faction is determined in relation with the other binder fraction.

In a preferred embodiment, the binder fraction comprises, in % by dry weight in respect with the total weight of hydraulic binder (a) supplementary cementitious material (e) and filler material (f):

- between 0.001 and 10, preferably between 0.01 and 5, and, more preferably, between 0.1 and 3, of said salt (ch) including at least one chaotropic ion,
- between 0.005 and 5.0 preferably between 0.01 and 3.0, and, more preferably, between 0.1 and 2, of said water reducing polymer (b), and
- between 0.1 and 10 preferably between 0.5 and 5, and, more preferably, between 1 and 3 of said accelerator (c).

The Hydraulic Binder (a)

Advantageously, the hydraulic binder (a) is selected from the group consisting of ordinary Portland cement, calcium aluminate cement, calcium sulfoaluminate cement, belite cement, hydraulic lime, ground granulated blast furnace slag, basic oxygen furnace slag, ladle slag, super sulfated cement, cement kiln dust, or a mixtures thereof.

Ordinary Portland cements and normalized cements often include a small amount of gypsum or an alternative calcium sulfate, which acts as a set regulator. However, gypsum may be added to the hydraulic binder.

The Water Reducing Polymer (b)

In a preferred embodiment, the water reducing polymer (b) is selected from the group consisting of lignosulfonate polymers, melamine sulfonate polymers, naphthalene sulfonate polymers, polycarboxylic acid ether polymers, polyoxyethylene phosphonates, vinyl copolymers, and mixtures thereof.

The Accelerator in the Form of a Salt Containing at Least One Kosmotropic Anion (c)

The kosmotropic ion could be mono or multivalent.

In a preferred embodiment the kosmotropic ion of the accelerator (c) is an anion from the group consisting of carbonate ($CO^{2-}$), sulfate ($SO_4^{2-}$), hydroxide ($OH^-$), citrate ($C_6H_5O_7^{3-}$), phosphate ($PO_4^{3-}$), hydrogen phosphate ($HPO_4^{2-}$), dihydrogen phosphate ($HPO_4^-$), tartrate ($C_4H_4O_6^{2-}$), acetate ($CH_3COO^-$), formate ($HCOO^-$), bicarbonate ($HCO_3^-$), orthosilicate ($SiO_4^{4-}$), metasilicate ($SiO_3^{2-}$), pyrosilicate ($Si_2O_7^{6-}$), polyphosphates, polysilicates and thiosulfate ($S_2O_2^{3-}$).

Advantageously, the cation of the accelerator (c) in the form of a salt is selected from the group consisting of sodium, potassium, and lithium.

The Salt Including at Least One Chaotropic Ion (Ch)

The chaotropic ion of the salt (ch) could be an anion or a cation, either mono or multivalent.

In a preferred embodiment the chaotropic ion of the salt (ch) is advantageously selected from the group consisting of chloride ($Cl^-$), bromide ($Br^-$), nitrate ($NO_3^-$), chlorate ($ClO_3^-$), perchlorate ($ClO_4^-$), tetrafluoroborate ($BF_4^-$), iodide ($I^-$), thiocyanate ($SCN^-$), hexafluorophosphate ($PF_6^-$), guanidinium ($C(NH_2)_3^+$), trichloroacetate ($CC_{l3}COO^-$), dichloroacetate ($CHCl_2COO^-$), chloroacetate ($CH_2ClCOO^-$), tribromoacetate ($CBr_3COO^-$), or trifluoroacetate ($CF_3COO^-$).

Advantageously, said salt (ch) including at least one chaotropic ion is selected from the group consisting of potassium thiocyanate (KSCN), potassium nitrate ($KNO_3$), potassium chloride (KCl), sodium thiocyanate (NaSCN), sodium nitrate ($NaNO_3$), sodium chloride (NaCl), magnesium chloride ($MgCl_2$), magnesium nitrate ($Mg(NO_3)_2$), calcium chloride ($CaCl_2$), calcium nitrate ($Ca(NO_3)_2$) calcium thiocyanate ($Ca_2SCN$), barium chloride ($BaCl_2$), strontium nitrate ($Sr(NO_3)_2$), guanidinium chloride ($CH_6ClN_3$) and guanidinium thiocyanate ($C_2H_6N_4S$).

Salt (Ch)/Accelerator (c) Ratio

The efficiency of the chaotropic ion depends on several factors like the type of accelerator, the type of water reducing polymer, the ratios between water/binder composition/aggregates/gravels in the resulting wet concrete or industrial mortar composition. A person skilled in the art could determine the optimal activator (c)/salt (ch)/water reducing polymer ratio with routine experimentations.

However, in a preferred embodiment, in the method according to the invention, the dry weight ratio of salt (ch) including at least one chaotropic ion to said accelerator (c) is comprised between 0.01 and 3.0.

Water (d)

In a preferred embodiment, the weight ratio water to hydraulic binder (d/a) is comprised between 0.08 and 1.0, preferably between 0.25 and 0.9, and more preferably selected in the group comprising-advantageously consisting in—the following ranges: [0.25; 0.35 [; [0.35; 0.45 [; [0.45; 0.6 [; [0.6; 0.9].

Supplementary Cementitious Material (e)

The supplementary cementitious material (e) is preferably selected from the group consisting of fly ash calcined and non-calcined clays, silica fume, basic oxygen furnace slag, natural pozzolanic materials, rice husk ash, activated recycled concrete fine aggregates or a mixtures thereof.

Filler Material (f)

The filler material (f) is preferably selected from the group consisting of ground limestone, ground dolomite, marble powder, siliceous sands, recycled concrete fine aggregates or a mixture thereof.

Additional Optional Components

The binder composition is advantageously enriched with one or several other components which are ingredients, notably functional additives preferably selected in the following list:

Water Retention Agent.

A water retention agent has the ability to retain the mixing water before setting. The water is so trapped in the wet paste formulation which improves its bond. To some extent, the water is less absorbed by the support.

The water retention agent is preferably chosen from the group comprising: modified celluloses, modified guars, modified cellulose ethers and/or guar ether and their mixes, more preferably consisting of: methylcelluloses, methylhydroxypropylcelluloses, methylhydroxyethyl-celluloses and their mixes.

Rheological Agent

The possible rheological agent (also named a “thickener”) is preferably chosen from the group comprising, more preferably consisting in: clays, starch ethers, cellulose ethers and/or gums (e.g. welan guar xanthane, succinoglycans), modified polysaccharides-preferably among modified starch ethers-, polyvinylic alcohols, polyacrylamides, clays, sepiolites, bentonites, and their mixes, and more preferably chosen in the group of clays, bentonite, montmorillonite.

Defoamerl Antifoams

The possible defoamer is preferably chosen in the group comprising, more preferably consisting in: polyether polyols and mixes thereof.

Biocide

The possible biocide is preferably chosen in the group comprising, more preferably consisting in: mineral oxides like zinc oxide and mixes thereof.

Pigment

The possible pigment is preferably chosen in the group comprising, more preferably consisting in: $TiO_2$, iron oxide and mixes thereof.

Flame Retardant

The possible flame retardant (or flame proof agent), which makes it possible to increase the fire resistance and/or to shrink the speed of flame spreading of the composition is preferably chosen in the group comprising, more preferably consisting in:

- minerals preferably aluminium hydroxide [$Al(OH)_3$, ATH], magnesium hydroxide MDH, hydromagnesite, hydrates, red phosphorus, and boron compounds, preferably borates,
- organohalogen compounds, preferably organochlorines and more preferably such as chlorendic acid derivatives and chlorinated paraffins; organobromines such as decabromodiphenyl ether (decaBDE), decabromodiphenyl ethane,
- polymeric brominated compounds preferably brominated polystyrenes, brominated carbonate oligomers (BCO’s), brominated epoxy oligomers (BEO’s), tetrabromophthalic anyhydride, Tetrabromobisphenol A(TBBPA) and hexabromocyclododecane (HBCD),
- antimony preferably pentoxide and sodium antimonite,
- organophosphorus compounds preferably organophosphate, TPP, RDP, BPADP, tri-o-cresyl phosphate,
- phosphonates preferably DMMP and phosphinates,
- chlorophosphates like TMCP and TDCP.

Air-Entraining Agents

Air-entraining agents (surfactants) are advantageously chosen in the group comprising, more preferably consisting in, natural resins, sulfated or sulfonated compounds, synthetic detergents, organic fatty acids and their mixes, preferably in the group comprising, more preferably consisting in, the lignosulfonates, the basic soaps of fatty acids and their mixes, and, more preferably in the group comprising, more preferably consisting in the sulfonate olefins, the sodium lauryl sulfate and their mixes.

Retarders

Retarders are advantageously chosen in the group, more preferably consisting in tartaric acid and its salts: sodium or potassium salts, citric acid and its salts: sodium (trisodium citrate) and their mixes;

- Fibres
- Dispersion powders
- Wetting agents
- Polymeric resins
- Complexing agents
- Drying shrinkage reducing agents based on polyols.

The total content of these optional other components is preferably comprised between 0.001% and 10% by weight of the total weight of the binder fraction.

Aggregate Fraction

Aggregates comprise a large category of particulate material used in construction, including sands, gravels, crushed stones, slag (not-granulated), recycled concrete and geosynthetic aggregates. They serve as reinforcement to add strength to the overall composite material.

The concrete or industrial mortar composition can also include fillers, for example based on quartz, limestone, or clays and mixtures thereof as well as light fillers, such as perlites, diatomaceous earth, expanded mica (vermiculite) and foamed sand, and mixtures thereof.

Advantageously, said concrete or industrial mortar composition also can include, apart from aggregates, one or several ingredients, especially functional admixtures, additions and fibres, which can be the same as the other optional component mentioned above in the "additional optional components" part.

The total content of these optional other components in the concrete or industrial mortar composition is preferably comprised between 0.1% and 10% by weight of the total weight of the aggregate fraction.

Process for Preparing Wet Concrete or Mortar Composition

The invention is also directed to a process for preparing wet concrete or mortar composition comprising a step of mixing together, simultaneously or not, separately or not, (a) at least one hydraulic binder,
(b) at least one water reducing polymer,
(c) at least one accelerator in the form of a salt containing at least one kosmotropic ion,
(d) water, and
(e) possibly one or more supplementary cementitious materials, and
(f) possibly one or more filler materials, at least one salt (ch) including at least one chaotropic ion, and at least one aggregate fraction.

According to the present disclosure, the term "mixing" has to be understood as any form of mixing.

In a preferred embodiment a part of the binder and at least a part of the water are mixed together prior to the mixing with the aggregate.

In a preferred embodiment, the process is carried out with a weight ratio water to hydraulic binder (d/a) comprised between 0.08 and 1.0, preferably between 0.25 and 0.9, and more preferably selected in the group comprising—advantageously consisting in—the following ranges: [0.25; 0.35 [; [0.35; 0.45 [; [0.45; 0.6 [; [0.6; 0.9].

In a preferred embodiment, for a given quantity of said at least one accelerator (c), quantities of said salt (ch) including at least one chaotropic ion and of said at least one water reducing polymer (b) are sufficient for both accelerating and managing the fluidity of the wet concrete or mortar composition, for a required duration after said mixing step, depending on the application, preferably for at least 2 hours after said mixing step.

Ready-Mix Concrete or Precast Concrete Composition

The invention also relates to a ready-mix concrete or precast concrete compositions, devoted in particular to building construction and civil engineering works, comprising at least one aggregate fraction, at least one salt (ch) including at least one chaotropic ion, and (a) at least one hydraulic binder,
(b) at least one water reducing polymer,
(c) at least one accelerator in the form of a salt containing at least one kosmotropic ion,
(d) water, and
(e) possibly one or more supplementary cementitious materials, and
(f) possibly one or more filler materials.

The invention is particularly beneficial for ready-mix concrete or precast concrete. Indeed, the fluidity of these concretes has to be maintained over a time period covering the production at the plant, the delivery and the employment at the site of final use.

Examples

The yield stress is the stress threshold for permanent deformation of a composition and characterizes its intrinsic fluidity or workability.

Yield Stress Time Evolution Procedure

The nature and the content of each component is set forth in table 1 below.

1. The components of the hydraulic binder are weighed and added to a mixing cup. The total mass is 100 g. When present, chaotropic salt(s) and activator(s) are added to the dry hydraulic binder in excess of the 100 g. The resulting binder composition is mixed at 150 RPM using an overhead stirrer (IKA Eurostar 40) equipped with a propeller blade, for 30 seconds.
2. Tap water is weighed to the desired mass and added to a mixing cup.
3. The water reducing polymer is weighed to the desired mass using a syringe.
4. The tap water is added to the mixing cup containing the binder composition (i.e. hydraulic binder and salt(s) and/or activator(s)). The resulting mixture is stirred for 30 seconds at 150 RPM, then for 90 seconds at 550 RPM and then left to rest for 120 seconds.
5. After said 120 seconds, the weighed water reducing polymer is added, and the wet composition is stirred for an additional 60 seconds at 550 RPM.
6. Then, the wet composition is poured or scooped into the sample cup of an AR-2000-ex rheometer until the cup is full. The rheometer is equipped with vane concentric cylinders as its geometry. The geometry is lowered into the measuring position.
7. The rheometer stabilizes the binder at approximately 20° C.
8. The wet composition is mixed at a shear rate of 25/s for 30 seconds to remove bubbles and ensure homogeneity.
9. The rheometer geometry begins rotating at a shear rate of 0.1/s. The measurement of stress at this shear rate is taken as the yield stress.
10. The shear rate is increases from 0.1/s to 50/s taking measurements at 15 different shear rates with a logarithmic measurement interval.
11. After completing the measurement at 50/s, the binder is mixed for 30 s at 25/s as in Step 8.
12. Measurements are taken as in Step 10 but in reverse (starting at 50/s and slowing to 0.1/s). The measurement at 0.1/s is not taken as the yield stress due to hysteresis.
13. Steps 8-12 are repeated as many times as required to cover the desired test duration.

TABLE 1

| Sample | Binder (weight %) | Accelerator (weight % in respect with the binder) | Chaotropic salt (weight % in respect with the binder) | Water reducing polymer (weight % in respect with the binder) | Weight ratio Chaotropic salt/ Water reducing polymer | Weight ratio Water/ Hydraulic binder |
|---|---|---|---|---|---|---|
| CE1 (counter-example) | Ground limestone (40%)<br>GGBS (30%)<br>CEM I 52.5 (20%)<br>Ultrafine ground limestone (10%) | None | None | Sika ViscoCrete Tempo 653 (0.5%) | 0 | 0.3 |

TABLE 1-continued

| Sample | Binder (weight %) | Accelerator (weight % in respect with the binder) | Chaotropic salt (weight % in respect with the binder) | Water reducing polymer (weight % in respect with the binder) | Weight ratio Chaotropic salt/ Water reducing polymer | Weight ratio Water/ Hydraulic binder |
|---|---|---|---|---|---|---|
| CE2 (counter-example) | Ground limestone (40%) GGBS (30%) CEM I 52.5 (20%) Ultrafine ground limestone (10%) | $Na_2SO_4$ (1.5%) | None | Sika ViscoCrete Tempo 653 (0.5%) | 0 | 0.3 |
| CE3 (counter-example) | Ground limestone (20%) GGBS (40%) CEM I 52.5 (40%) | None | None | Sika ViscoCrete Tempo 10 (0.5%) | 0 | 0.3 |
| CE4 (counter-example) | Ground limestone (20%) GGBS (40%) CEM I 52.5 (40%) | $Na_2SO_4$ (0.75%) | None | Sika ViscoCrete Tempo 10 (0.5%) | 0 | 0.3 |
| CE5 (counter-example) | CEM I 52.5 (50%) Metakaolin (30%) Ground limestone (15%) Gypsum (5%) | None | None | Sika ViscoCrete Krono 26 (0.8%) | 0 | 0.3 |
| CE6 (counter-example) | CEM I 52.5 (50%) Metakaolin (30%) Ground limestone (15%) Gypsum (5%) | $Na_2SO_4$ (1.5%) | None | Sika ViscoCrete Krono 26 (0.8%) | 0 | 0.3 |
| E1 (Invention) | Ground limestone (40%) GGBS (30%) CEM I 52.5 (20%) Ultrafine ground limestone (10%) | $Na_2SO_4$ (1.5%) | KSCN (2.0%) | Sika ViscoCrete Tempo 653 (0.5%) | 4 | 0.3 |
| E2 (Invention) | Ground limestone (40%) GGBS (30%) CEM I 52.5 (20%) Ultrafine ground limestone (10%) | $Na_2SO_4$ (1.5%) | $Ca(NO_3)_2$ (3.0%) | Sika ViscoCrete Tempo 653 (0.5%) | 6 | 0.3 |
| E3 (Invention) | Ground limestone (40%) GGBS (30%) CEM I 52.5 (20%) Ultrafine ground limestone (10%) | $Na_2SO_4$ (1.5%) | $MgCl_2$ (1.0%) | Sika ViscoCrete Tempo 653 (0.5%) | 2 | 0.3 |
| E4 (Invention) | Ground limestone (40%) GGBS (30%) CEM I 52.5 (20%) Ultrafine ground limestone (10%) | $Na_2SO_4$ (1.5%) | $K(NO_3)_2$ (1.0%) | Sika ViscoCrete Tempo 653 (0.5%) | 2 | 0.3 |
| E5 (Invention) | Ground limestone (20%) GGBS (40%) CEM I 52.5 (40%) | $Na_2SO_4$ (0.75%) | $Ca(SCN)_2$• 4 $H_2O$ (0.75%) | Sika ViscoCrete Tempo 10 (0.5%) | 1.5 | 0.3 |
| E6 (Invention) | Ground limestone (20%) GGBS (40%) CEM I 52.5 (40%) | $Na_2SO_4$ (0.75%) | $Mg(NO_3)_2$• 4 $H_2O$ (0.75%) | Sika ViscoCrete Tempo 10 (0.5%) | 1.5 | 0.3 |
| E7 (Invention) | CEM I 52.5 (50%) Metakaolin (30%) Ground Limestone (15%) Gypsum (5%) | $Na_2SO_4$ (1.5%) | $MgCl_2$ (1%) | Sika ViscoCrete Krono 26 (0.8%) | 2 | 0.3 |

FIG. 1 is a graph representing the yield stress versus time after mixing of the sample CE1, CE2 and E1.

Figure 2:
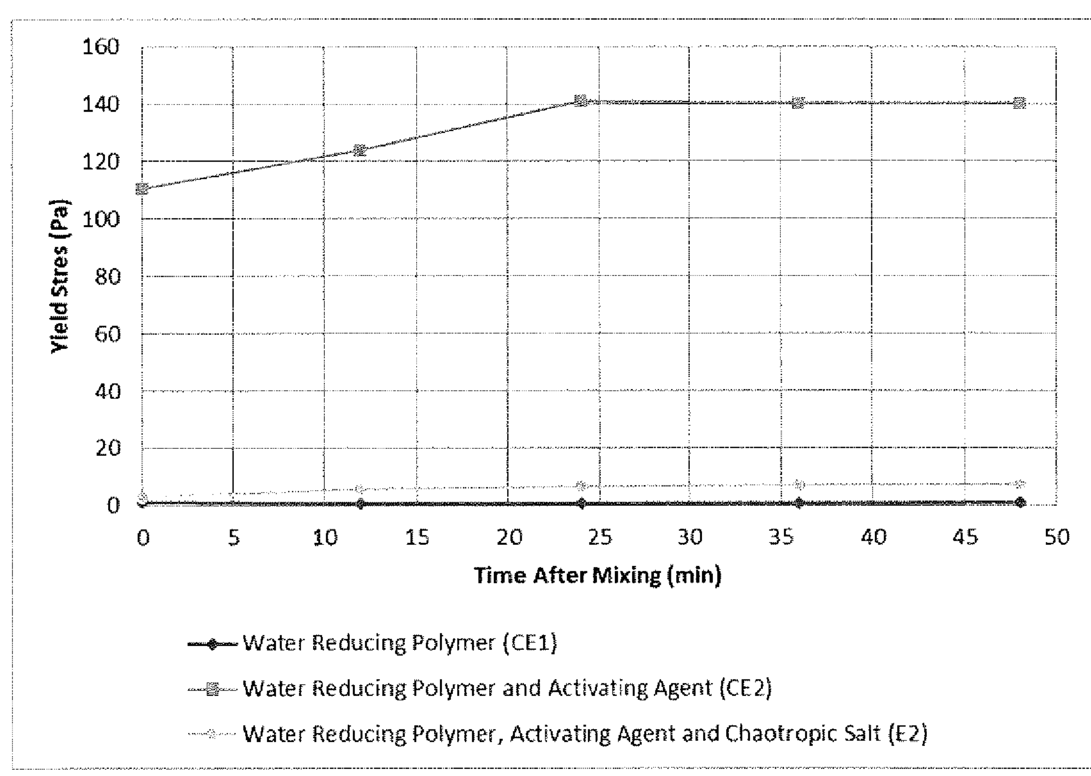

FIG. 2 is a graph representing the yield stress versus time after mixing of the sample CE1, CE2 and E2.

Figure 3:
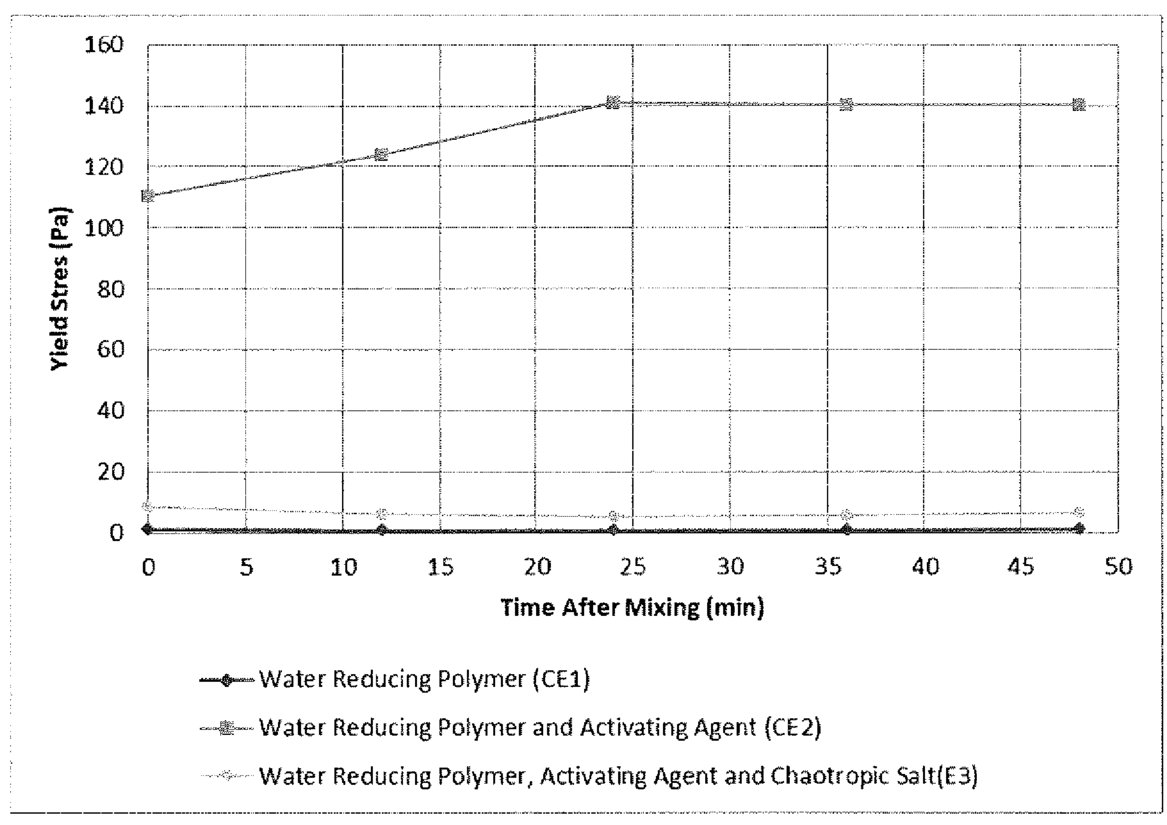

FIG. 3 is a graph representing the yield stress versus time after mixing of the sample CE1, CE2 and E3.

Figure 4:
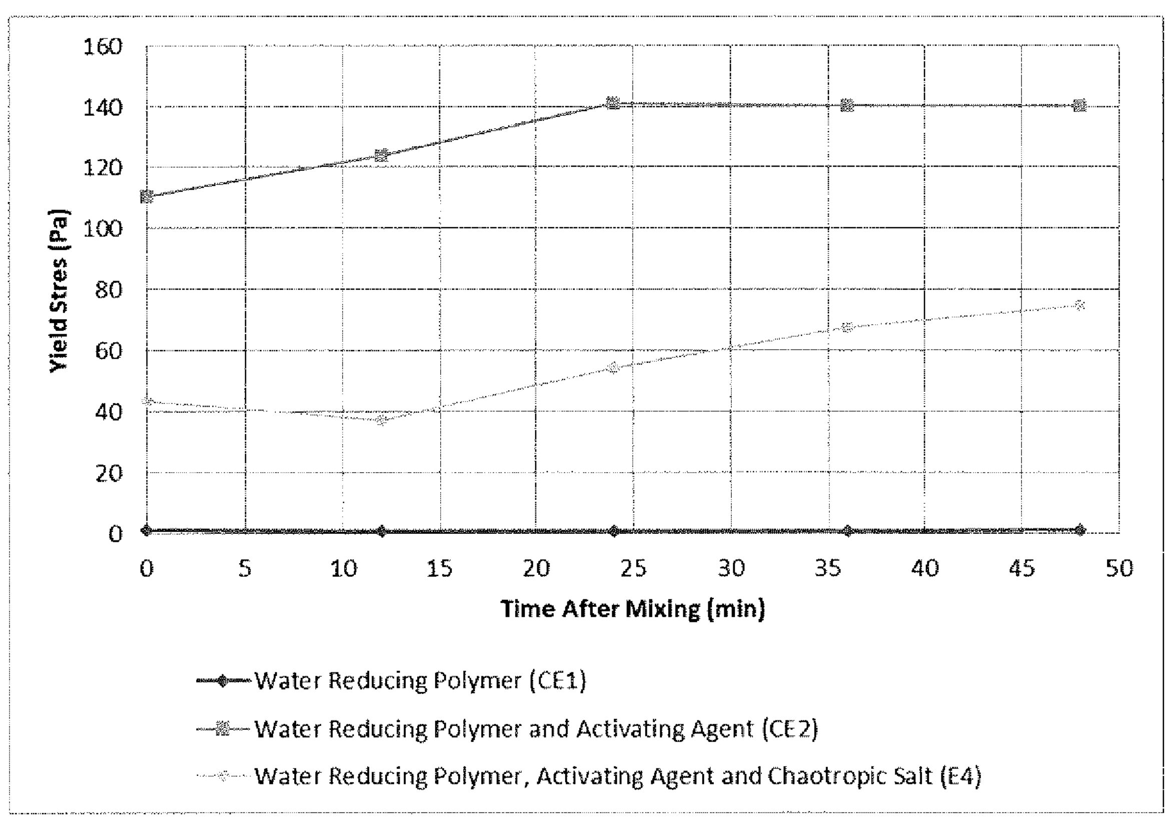

FIG. 4 is a graph representing the yield stress versus time after mixing of the sample CE1, CE2 and E4.

Figure 5:
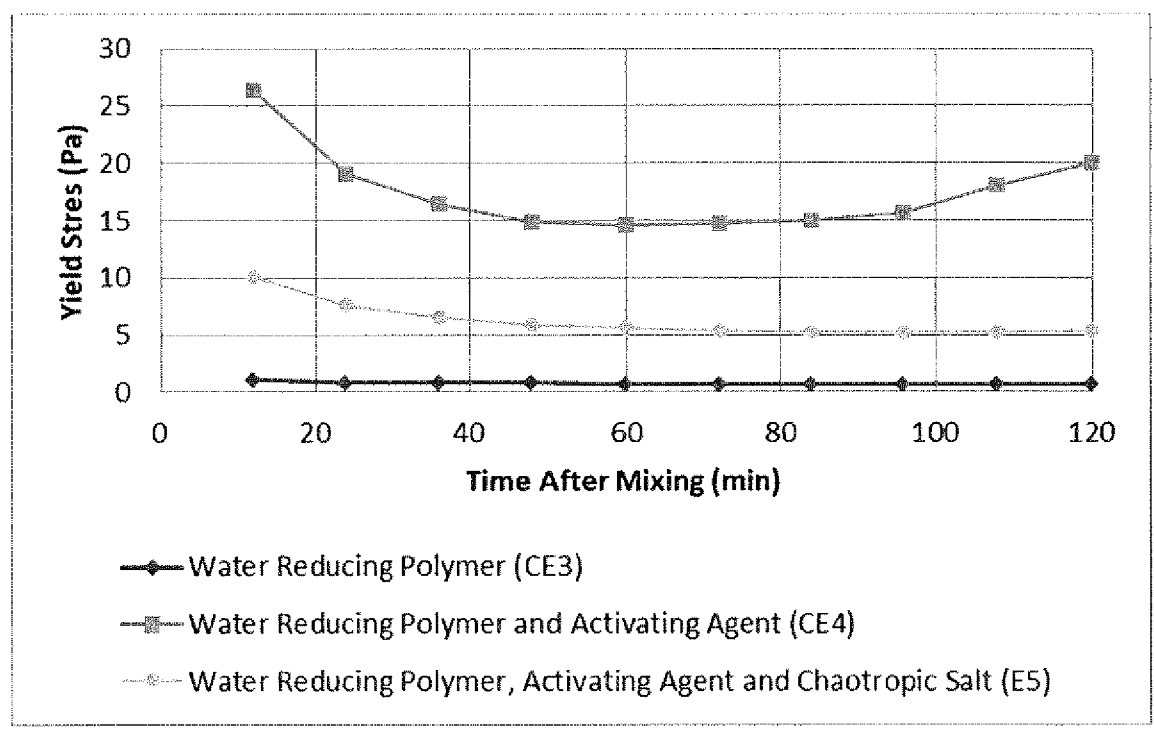

FIG. 5 is a graph representing the yield stress versus time after mixing of the sample CE3, CE4 and E5.

Figure 6:
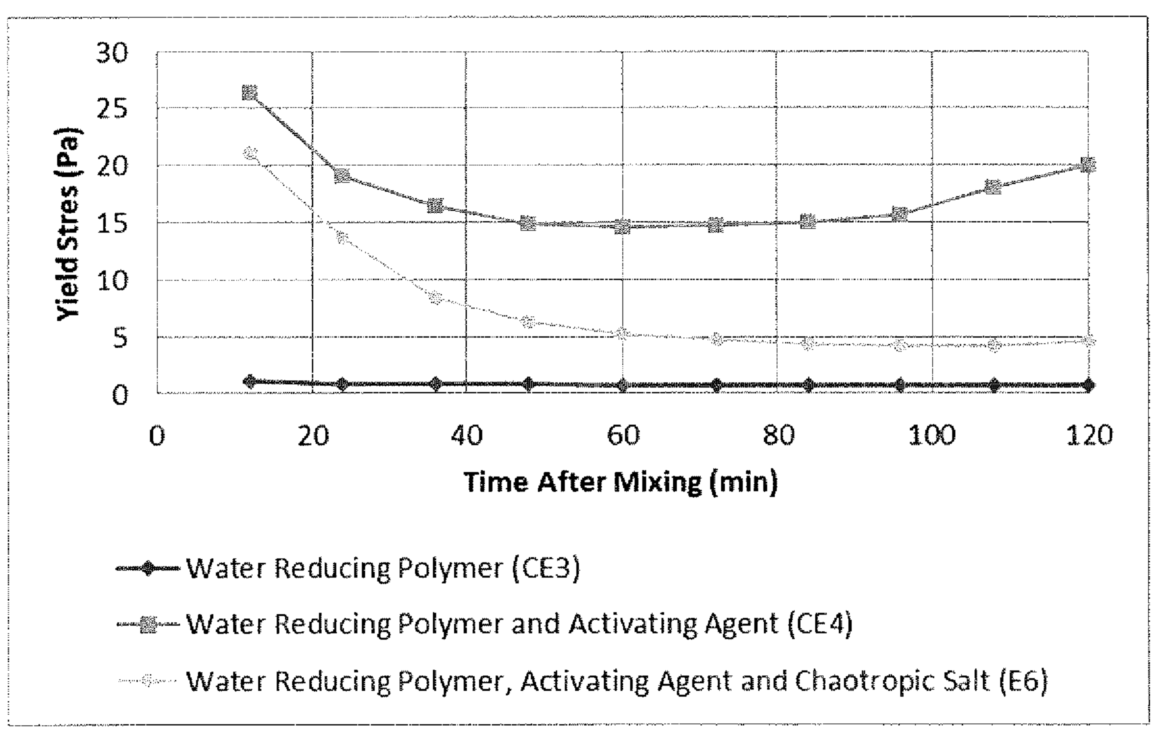

FIG. 6 is a graph representing the yield stress versus time after mixing of the sample CE3, CE4 and E6.

Figure 7:
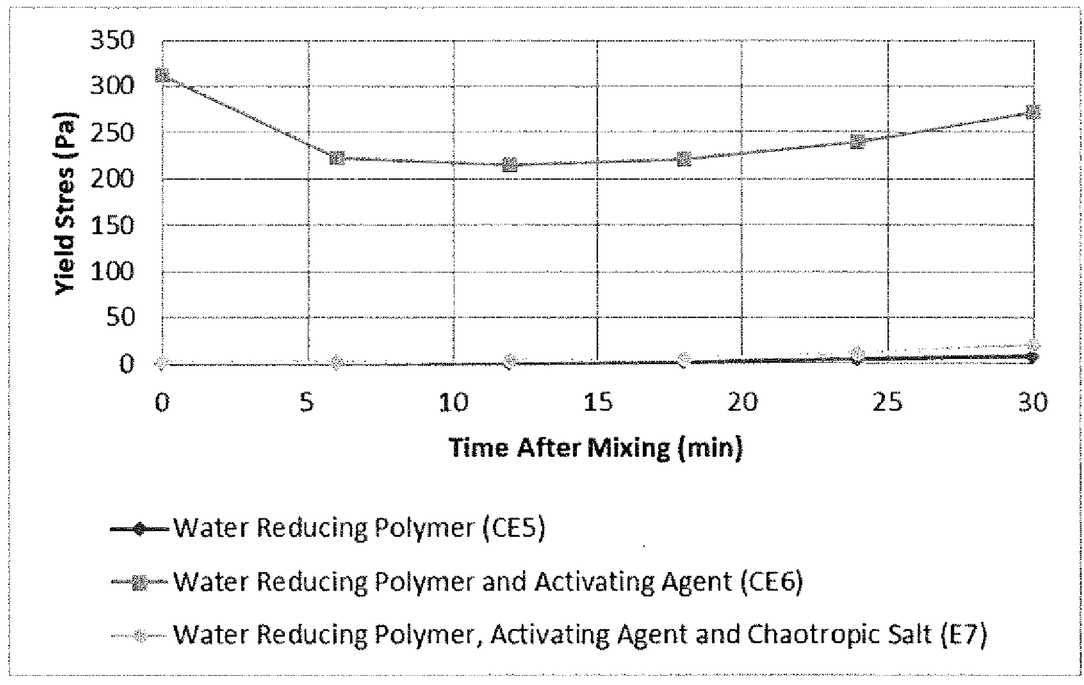

FIG. 7 is a graph representing the yield stress versus time after mixing of the sample CE5, CE6 and E7.

As can be seen on these graphs in the absence of accelerator (c) and a salt (ch) including a chaotropic ion, the yield stresses of composition CE1 and CE5 are almost equal to 0 Pa and the yield stress of composition CE3 is around 1 Pa, these yield stresses do not significantly evolve with time. Such low yield stresses are due to the presence of a water reducing polymer which fluidifies the binder composition.

On the contrary, the addition of an accelerator (c) comprising a kosmotropic ion (CE2, CE4 and CE6) significantly increases the yield stress. The accelerator (c) significantly degrades the fluidity of the samples and the effect of the water reducing polymer is significantly reduced.

Thanks to the addition of a salt (ch) including a chaotropic ion (E1 to E7) according to the invention, it is possible to decrease the yield stresses.

Calorimetry

The total heat released by a sample can act as a proxy for hydration and/or strength development at early age.

The nature and the content of each component are set forth in table 1 above.

1. The components of the binder are weighed and added to a mixing cup. The total mass is 50 g. When present, salt(s) and activator(s) are added to the dry hydraulic binder in excess of the 50 g. The resulting binding composition is mixed at 150 RPM using an overhead stirrer (IKA Eurostar 40) equipped with a propeller blade for 30 seconds.
2. Tap water is weighed to the desired mass and added to a mixing cup.
3. The water reducing polymer is weighed to the desired mass using a syringe.
4. The tap water is added to the mixing cup containing the binding composition (i.e. hydraulic binder and salt(s) and/or activator(s)). The resulting mixture is stirred for 30 seconds at 150 RPM and, then for 90 seconds at 550 RPM and then left to rest for 120 seconds.
5. After said 120 seconds, the weighed water reducing polymer is added, and the wet composition is stirred for an additional 60 seconds at 550 RPM.
6. Approximately 5 g of the wet composition is placed inside a plastic ampoule. The mass is recorded, and the ampoule is sealed.
7. The ampoule is placed inside a measurement cell in a TAM Air isothermal micro-calorimeter.
8. The calorimeter measures the heat flow coming from the wet composition sample over a given measurement duration.

Figure 8:
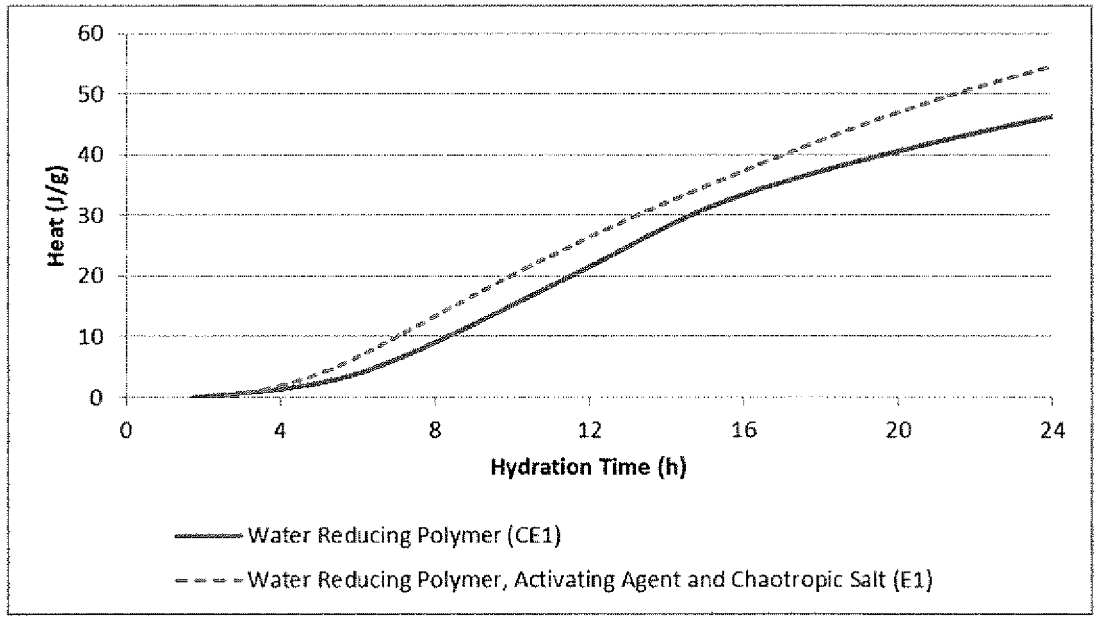
FIGS. 8 to 10 are graphs of heat versus time after mixing of wet binder composition samples. These graphs present the impact of the invention on the heat produced by paste samples over the first 24 hours. Heat can be used as a proxy for evaluating the relative early-age strength of such binders due to the exothermic nature of the hydration of cementitious systems.

FIG. 8 is a graph representing the heat generated per unit mass over the first 24 hours after mixing of the sample CE1 and E1.

Figure 9:
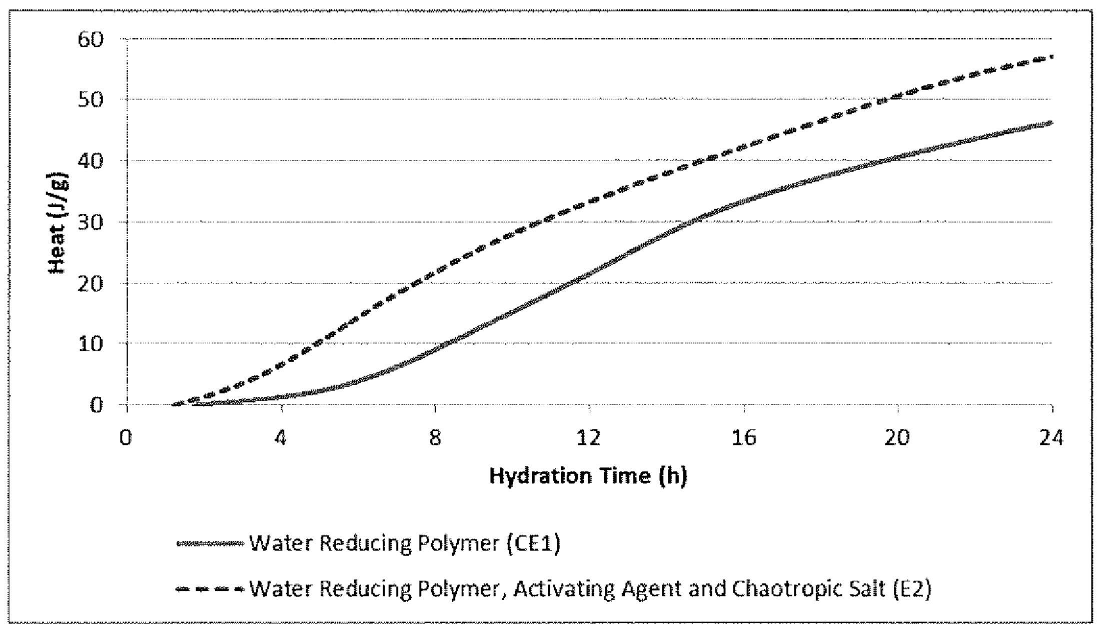

FIG. 9 is a graph representing the heat generated per unit mass over the first 24 hours after mixing of the sample CE1 and E2.

Figure 10:
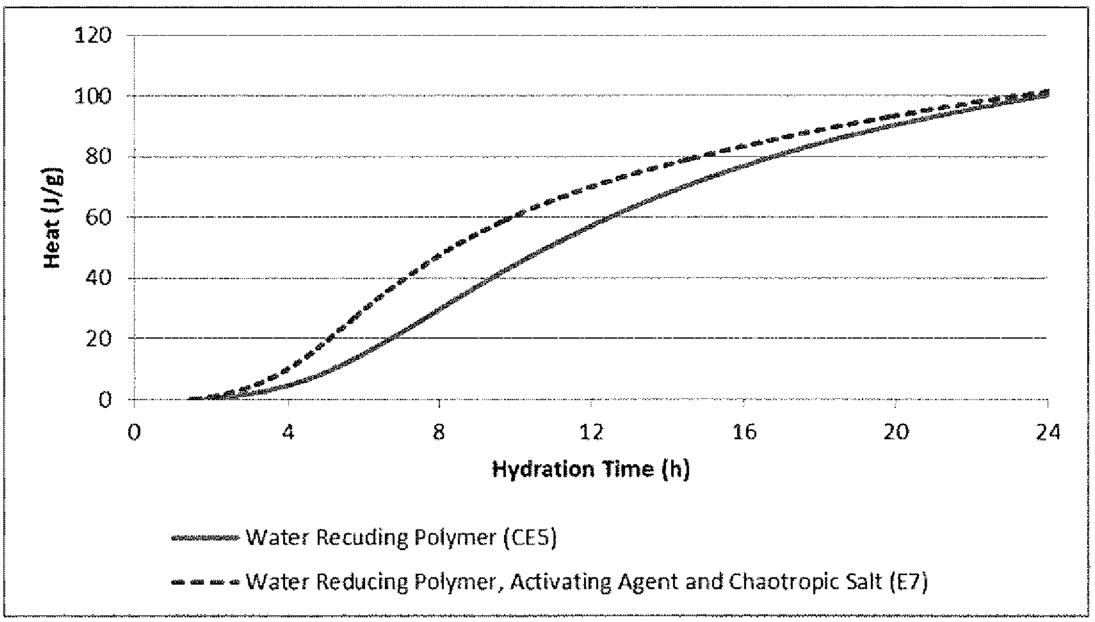

FIG. 10 is a graph representing the heat generated per unit mass over the first 24 hours after mixing of the sample CE5 and E7.

As can be seen on these graphs, the heat produced by samples E1 and E2 are greater than sample CE1 for the duration of the testing period and the heat produced by sample E7 is greater than sample CE5 for the duration of the testing period. The amount of heat produced by a paste sample can act as a proxy for strength development as the hydration of cementitious systems is an exothermic process. Thus, it would be expected that mortar and concrete compositions would achieve higher early age strengths thanks to the invention.

The invention claimed is:

1. A method for fluidifying wet concrete or industrial mortar compositions comprising:

(a) at least one hydraulic binder, (b) at least one water reducing polymer, (c) at least one accelerator in the form of a salt containing at least one kosmotropic ion, (d) water, and (e) optionally one or more supplementary cementitious materials, and (f) optionally one or more filler materials, the method comprising a step of adding of at least one salt (ch) including at least one chaotropic ion to the concrete or industrial mortar composition, wherein water (d) is present in a weight ratio of water to hydraulic binder (d/a) between 0.25 and 0.45.

2. The method according to claim 1, wherein the dry weight ratio of salt (ch) comprising at least one chaotropic ion to said accelerator (c) is comprised between 0.01 and 3.0.

3. The method according to claim 1, wherein the water reducing polymer (b) is selected from the group consisting of lignosulfonate polymers, melamine sulfonate polymers, naphthalene sulfonate polymers, polycarboxylic acid ether polymers, polyoxyethylene phosphonates, vinyl copolymers, and mixtures thereof.

4. The method according to claim 1, wherein the kosmotropic ion of the accelerator (c) is an anion from the group consisting of carbonate ($CO^{2-}$), sulfate ($SO_4^{2-}$), hydroxide ($OH^-$), citrate ($C_6H_5O_7^{3-}$), phosphate ($PO_4^{3-}$), hydrogen phosphate ($HPO_4^{2-}$), dihydrogen phosphate ($HPO_4^-$), tartrate ($C_4H_4O_6^{2-}$), acetate ($CH_3COO^-$), formate ($HCOO^-$), bicarbonate ($HCO_3^-$), orthosilicate ($SiO_4^{4-}$), metasilicate ($SiO_3^{2-}$), pyrosilicate ($Si_2O_7^{6-}$), polyphosphates, polysilicates, and thiosulfate ($S_2O_2^{3-}$).

5. The method according to claim 1, wherein the cation of the accelerator (c) is selected from the group consisting in sodium, potassium and lithium.

6. The method according to claim 1, wherein said chaotropic ion of the salt (ch) is selected from the group consisting of chloride ($Cl^-$), bromide ($Br^-$), nitrate ($NO_3^-$), chlorate ($ClO_3^-$), perchlorate ($ClO_4^-$), tetrafluoroborate ($BF_4^-$), iodide ($I^-$), thiocyanate ($SCN^-$), hexafluorophosphate ($PF_6^-$), guanidinium ($C(NH_2)_3^+$), trichloroacetate ($CCl_3COO^-$), dichloroacetate ($CHCl_2COO^-$), chloroacetate ($CH_2ClCOO^-$), tribromoacetate ($CBr_3COO^-$), or trifluoroacetate ($CF_3COO^-$).

7. The method according to claim 1, wherein said salt (ch) including at least one chaotropic ion is selected from the group consisting of potassium thiocyanate (KSCN), potassium nitrate ($KNO_3$), potassium chloride (KCl), sodium thiocyanate (NaSCN), sodium nitrate ($NaNO_3$), sodium chloride (NaCl), magnesium chloride ($MgCl_2$), magnesium nitrate ($Mg(NO_3)_2$), calcium chloride ($CaCl_2$), calcium nitrate ($Ca(NO_3)_2$) calcium thiocyanate ($Ca_2SCN$), barium chloride ($BaCl_2$), strontium nitrate ($Sr(NO_3)_2$), guanidinium chloride ($CH_6ClN_3$) and guanidinium thiocyanate ($C_2H_6N_4S$).

8. The method according to claim 1, wherein the hydraulic binder (a) is selected from the group consisting of ordinary Portland cement, calcium aluminate cement, calcium sulfoaluminate cement, belite cement, hydraulic lime, ground granulated blast furnace slag, basic oxygen furnace slag, ladle slag, super sulfated cement, cement kiln dust, or a mixture thereof.

9. The method according to claim 1, wherein the supplementary cementitious material (e) is selected from the group consisting of fly ash, activated clay, silica fume, basic oxygen furnace slag, natural pozzolanic materials, rice husk ash, activated recycled concrete fine aggregates or a mixtures thereof and/or wherein the filler material (f) is selected from the group consisting of ground limestone, ground dolomite, marble powder, siliceous sands, recycled concrete fine aggregates or a mixture thereof.

10. A process for preparing wet concrete or mortar composition comprising a step of mixing together, simultaneously or not, separately or not, (a) at least one hydraulic binder, (b) at least one water reducing polymer, (c) at least one accelerator in the form of a salt containing at least one kosmotropic ion, (d) water, and (e) optionally one or more supplementary cementitious materials, and (f) optionally one or more filler materials, at least one salt (ch) including at least one chaotropic ion, and at least one aggregate fraction, wherein water (d) is present in a weight ratio of water to hydraulic binder (d/a) between 0.25 and 0.45.

* * * * *